(No Model.) 2 Sheets—Sheet 2.

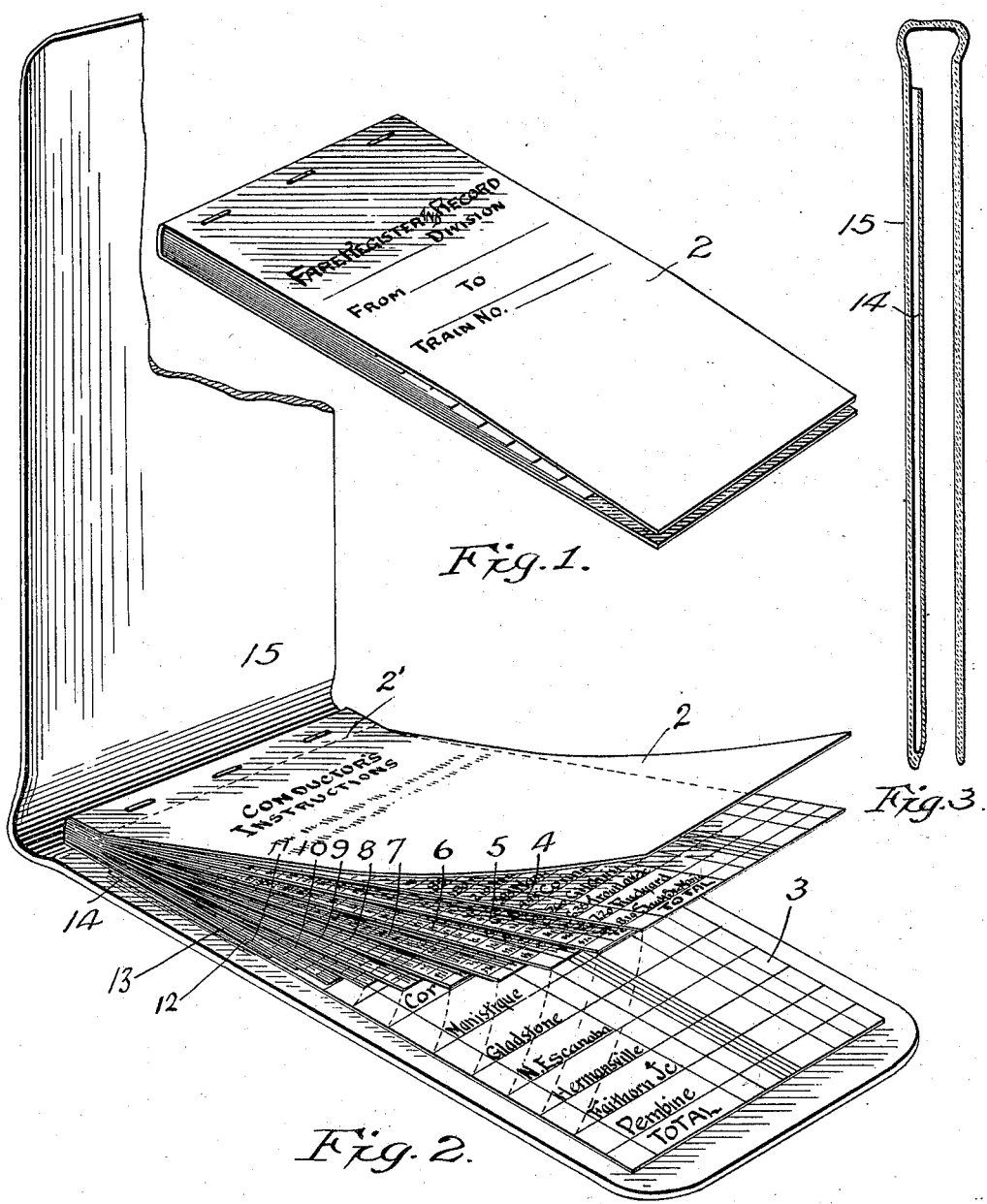

G. D. SHAFT & H. HAYS.
FARE REGISTER AND RECORD.

No. 603,861. Patented May 10, 1898.

Fig. 4. — Conductor's Register Sheet. Date May 5, '97. Train No. 42. John Jones, Conductor. Pembine. 8 Division.

| FARE | TO | FULL CASH FARES | HALF CASH FARES | TOTAL CASH | WHOLE TICKETS | HALF TICKETS | PASSES |
|---|---|---|---|---|---|---|---|
| .55 | Faithorn Jc. | 11 | 1 | 137 | 1 | | |
| .85 | Hermansville | | | | | | |
| 1.90 | North Escanaba | | | | | | |
| 2.10 | Gladstone | 1 | | 210 | 1111 | | 1 |
| 3.85 | Manistique | | | | | | |
| 4.95 | Corinne | | | | | | |
| 5.60 | Gilchrist | | | | | | |
| 6.35 | Trout Lake Jc. | | | | | | |
| 7.20 | Rudyard | | | | | | |
| 8.10 | Sault Ste Marie | | | | 11111 | 1 | 111 |
| | TOTAL | 3 | 1 | 347 | 10 | 1 | 4 |

Fig. 5. — Conductor's Register Sheet. Date May 5, '97. Train No. 42. John Jones, Conductor. Faithorn Jc. 8 Division.

| FARE | TO | FULL CASH FARES | HALF CASH FARES | TOTAL CASH | WHOLE TICKETS | HALF TICKETS | PASSES |
|---|---|---|---|---|---|---|---|
| .35 | Hermansville | 1 | | 35 | 111 | | |
| 1.40 | North Escanaba | | | | | | |
| 1.60 | Gladstone | 1 | | 160 | 1111 | 1 | 1 |
| 3.35 | Manistique | | | | | | |
| 4.45 | Corinne | | | | | | |
| 5.10 | Gilchrist | | | | | | |
| 5.85 | Trout Lake Jc. | 1 | | 585 | 11111 | | 11 |
| 6.70 | Rudyard | | | | | | |
| 7.60 | Sault Ste Marie | 1 | | 760 | 111111 | 11 | 1 |
| | TOTAL | 4 | | 1540 | 18 | 3 | 4 |

Fig. 7. — Conductor's Register Sheet. Date May 5, '97. Train No. 42. John Jones, Conductor. Rudyard. 8 Division.

| FARE | TO | FULL CASH FARES | HALF CASH FARES | TOTAL CASH | WHOLE TICKETS | HALF TICKETS | PASSES |
|---|---|---|---|---|---|---|---|
| .90 | Sault Ste Marie | | | | | | |
| | TOTAL | | | | | | |
| | Rudyard | 4 | | 360 | 10 | | |
| | Trout Lake Jc. | | | none | | | |
| | Gilchrist | | | none | | | |
| | Corinne | | | none | | | |
| | Manistique | | | | 6 | 1 | 2 |
| | Gladstone | 2 | | 12 | 5 | | |
| | North Escanaba | | | | 4 | 1 | 3 |
| | Hermansville | | 2 | 725 | 2 | | 1 |
| | Faithorn Jc. | 4 | | 1540 | 18 | 3 | 4 |
| | Pembine | 3 | 1 | 347 | 10 | 1 | 4 |
| | TOTAL | 13 | 3 | 4172 | 55 | 6 | 14 |

Fig. 6. — Conductor's Record Sheet. Date May 5, '97. Train No. 42. John Jones, Conductor. 8 Division.

| | FULL CASH FARES | HALF CASH FARES | TOTAL CASH | WHOLE TICKETS | HALF TICKETS | PASSES | Proof Col. |
|---|---|---|---|---|---|---|---|
| Sault Ste Marie | | | | | | | |
| Rudyard | 4 | | 360 | 10 | | | 14 |
| Trout Lake Jc. | | | none | | | | 0 |
| Gilchrist | | | none | | | | 0 |
| Corinne | | | none | | | | 0 |
| Manistique | | | | 6 | 1 | 2 | 9 |
| Gladstone | 2 | | 12 | 5 | | | 7 |
| North Escanaba | | | | 4 | 1 | 3 | 8 |
| Hermansville | | 2 | 725 | 2 | | 1 | 5 |
| Faithorn Jc. | 4 | | 1540 | 18 | 3 | 4 | 29 |
| Pembine | 3 | 1 | 347 | 10 | 1 | 4 | 19 |
| TOTAL | 13 | 3 | 4172 | 55 | 6 | 14 | 91 |

Witnesses:
C. E. Van Doren
M. G. Gooley

Inventors:
Grant D. Shaft
Henry Hays
By Paul C. Hawley their attys.

UNITED STATES PATENT OFFICE.

GRANT D. SHAFT, OF ST. PAUL, AND HENRY HAYS, OF MINNEAPOLIS, MINNESOTA; SAID SHAFT ASSIGNOR OF HIS RIGHT AND SAID HAYS ASSIGNOR OF ONE-FOURTH OF HIS RIGHT TO CHARLES G. HAWLEY AND PETER B. CRANE, OF MINNEAPOLIS, MINNESOTA.

FARE REGISTER AND RECORD.

SPECIFICATION forming part of Letters Patent No. 603,861, dated May 10, 1898.

Application filed May 14, 1897. Serial No. 636,519. (No model.)

*To all whom it may concern:*

Be it known that we, GRANT D. SHAFT, of the city of St. Paul, county of Ramsey, and HENRY HAYS, of Minneapolis, Hennepin county, Minnesota, have invented certain new and useful Improvements in Fare Registers and Records, of which the following is a specification.

Our invention relates to means whereby conductors or collectors may make an exact register and record of all fares collected during a certain run.

The invention further relates to particular means for preventing fraud upon the part of either passengers or conductors.

The object of the invention is to provide convenient means for registering the fares and kinds of fares collected from passengers on railroad-trains and to provide means whereby the auditor or other officer may be accurately and correctly informed of all fares collected.

A further object is to provide a device of this class in a small, compact, and neat form and which will materially lessen the time taken by the conductor in making up his reports.

The invention consists generally in the combination of a record-sheet having a line or space devoted to each station, with a series of register-sheets each devoted to a particular station, said register-sheets varying in length in regular order; and, further, the invention consists in the particular arrangement of the register-sheets with respect to the record-sheet, whereby the transfers of totals from one to the other is facilitated; and, further, the invention consists in the particular arrangement of lines and columns upon the several sheets, and, further, in particular constructions and combinations of parts, all as hereinafter described, and particularly pointed out in the claims.

The invention will be more readily understood by reference to the accompanying drawings, forming part of this specification, in which—

Figure 1 is a perspective view of a fare register or record embodying our invention. Fig. 2 is a perspective view showing the book placed in the cover as it is actually used. Fig. 3 is a sectional view of the cover alone. Fig. 4 illustrates the first or top sheet of the book. Fig. 5 illustrates the second register-sheet. Fig. 6 illustrates the record-sheet. Fig. 7 illustrates the last register-sheet with the record-sheet beneath it.

As shown in the drawings, the book proper is made up of the cover 2, inclosing the same number of leaves or sheets as there are stations in the division or run. Supposing there are eleven stations, inclusive, at which the train stops, there will be a record-sheet 3 and register-sheets 4, 5, 6, 7, 8, 9, 10, 11, 12, and 13. The register-sheets are varied in length in regular order, decreasing in length by one space or line beginning with the first and longest register-sheet. The record-sheet 3 is two spaces or lines longer than the longest register-sheet. The longest register-sheet is devoted or appropriated to the station from which the train starts. The next sheet is devoted to the second station of the run, and so on. These sheets lie flat upon the record-sheet, so that after filling out the spaces and columns of the first register-sheet and carrying the same into the total-line the totals may be readily transferred or duplicated in the record-sheet line or space devoted to the station the name of which appears at the top of the first register-sheet, such name appearing in the bottom name-space of the record-sheet. The same order and relation of the registering-sheets to the spaces upon the record-sheet are preserved throughout, so that after all of the register-sheets are filled in the totals thereof will appear upon the record-sheet, as shown in the drawings. The cover is provided upon the front with instructions to the conductor and with all the intervening sheets is perforated on the line, so that the cover and any sheet may be torn off. The back of the cover is not perforated and is intended to slip into the pocket 14 in the cover 15. The back bears the title of the book and blanks for the division-number and the description of the run. The registering-sheets and the record-sheet will be better understood by reference to Figs. 4 and 7, wherein it will be seen that each register-sheet is provided with the space or heading at the top, in which are blanks for the date, the train-number, name of the conductor, and division number or name, and the name of the station to which the particular sheet is devoted. Beneath the heading are columns 15, 16, 17, 18, 19, 20, 21, 22, and 23. The column 15 is devoted to figures indicating the fares from the station named at the top of the sheet to the other stations named in the column 16. The column 17 is for marks indicating the full cash fares, the column 18 for marks indicating half cash fares, the column 19 for figures indicating the total cash received at each station, the column 20 for marks indicating the number of whole tickets received, the column 21 for marks indicating the number of half-tickets, the column 22 for marks indicating the number of passes, and the column 23 is the proof-column, not used by the conductor, but used by the auditor in proving the totals given by the conductor.

In order to illustrate the use of the device, we have given the names of a series of stations upon a certain line. The station from which the conductor starts with the train is the initial station "Pembine" and the stations reached in order are "Faithorn Junction," "Hermansville," "North Escanaba," "Gladstone," "Manistique," "Corinne," "Gilchrist," "Trout Lake Junction," "Rudyard," and "Sault Ste. Marie." When collecting the fares after leaving the first station, "Pembine," the conductor will place a vertical mark opposite the destination of each passenger and in the proper column to indicate the kind of fare received. Before reaching the next station, "Faithorn Junction," the conductor will add the columns, placing the totals at the bottom of the sheet, and will transfer the totals to the "Pembine" line or space upon the record-sheet. The register-sheets are perforated, as explained, so that they may be torn from the book, and upon reaching the next station the conductor will tear out the "Pembine" sheet and leave the same with the agent at "Faithorn Junction" to be forwarded to the auditor or passenger agent. The next sheet appearing in his book will be headed "Faithorn Junction" and will be filled out according to the passengers boarding the train at that station and with the kinds of fares and the total amount of cash received. The totals will in turn be transferred from this sheet to the "Faithorn Junction" line or space upon the record-sheet and the register-sheet mailed to the auditor when the train reaches "Hermansville." The process of checking and registering is thus continued from station to station, the conductor retaining the record-sheet until he has finished his run—that is, until he has arrived at the last station, "Sault Ste. Marie." He will then add the columns of the record-sheet and mail or turn in said sheet from the last station and with the last register-sheet. At the same time he will turn in the tickets, mileage, passes, and cash received.

The auditor upon receiving the record-sheet will add the figures in each line or space and place the same in the column 23, and upon footing up this column it should accord with the total of all of the fares marked opposite the word "Total" at the bottom of the record-sheet. If there are no fares collected, the conductor will write the word "None" across the register-sheet and in the proper space on the record-sheet.

To more fully illustrate the use of the device, the register and record sheets shown in Figs. 4 to 7 are marked as though by the conductor, the short vertical marks upon the register-sheets representing passengers and being placed in the proper columns, according to the kind of fare received. The cash is indicated in figures and upon the record-sheet and at the bottom of the register-sheets. All marks are in figures. Fig. 6 also represents the auditor's proof in the last column, the sum of the figures in the last column being the same as the sum of the figures upon the total-line disregarding the footing of the cash-column.

An exact register and record of every fare may thus be made, and as the register-sheets pass out of the control of the conductor as soon as they are made up obviously he cannot alter his record, the totals of all of the registering-sheets being compared with his record-sheet in the auditor's office. In addition to being a positive check upon the conductor the device is particularly valuable, as it gives the number of passengers that board the train at every point and also their destination, which information is particularly desired in case of an accident. When the record and register sheets have been torn from the book, the cover may be thrown away.

Having thus described our invention, we declare as new and desire to secure by Letters Patent—

1. The combination, in a fare register or record, of a record-sheet, with a series of register-sheets devoted each to a particular station, and arranged in regular order, each register-sheet bearing the names of the stations between its particular station and the terminus or last station, and said record-sheet having the names of the stations in order, and the same appearing beneath the lower edges of respective register-sheets as and for the purpose specified.

2. The combination, in a fare register and record, of a record-sheet bearing the names of all of the stations in order, with a series of sheets devoted to particular stations and of varying lengths in regular order, each register-sheet bearing the names of the stations between its particular station and the terminus or last station, and said sheets being divided into vertical columns, as and for the purpose specified.

3. The combination, in a fare-register, of a series of separable sheets of varying lengths, each devoted to a particular station and bearing the names of all stations between said particular station and the terminus or last station, and said sheets being divided into columns marked according to the kind of fares.

4. The combination, in a fare register and record, of record and register sheets, each having a heading substantially as described and divided into vertical columns marked with the names of the kinds of fare, said record-sheet bearing the names of all of the stations, said register-sheets being each devoted to a particular station and bearing the names of all of the stations between said particular station and the terminus or last station named upon the record-sheet, and the names upon the record-sheet arranged to appear beneath the lower edges of register-sheets devoted to respective stations, substantially as described.

In testimony whereof we have hereunto set our hands this 11th day of May, A. D. 1897.

GRANT D. SHAFT.
HENRY HAYS.

In presence of—
C. G. HAWLEY,
A. F. HOLMES.